(12) United States Patent
Goodwin, III et al.

(10) Patent No.: US 6,317,724 B1
(45) Date of Patent: *Nov. 13, 2001

(54) METHOD OF TEMPORARILY CHANGING AN ELECTRONIC PRICE LABEL DISPLAY SEQUENCE

(75) Inventors: John C. Goodwin, III, Suwanee; Terry L. Zimmerman, Lawrenceville, both of GA (US)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/375,701

(22) Filed: Aug. 16, 1999

(51) Int. Cl.$^7$ ...................................... G06F 17/60
(52) U.S. Cl. .................. 705/20; 705/16; 705/23; 340/825.55; 235/383
(58) Field of Search .................. 705/20, 21, 14, 705/16, 23, 26; 235/383, 462.15, 472.01; 340/825.35, 825.52, 825.55

(56) References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,924,363 | 5/1990 | Kornelson | 362/125 |
| 5,172,314 | 12/1992 | Poland et al. | 364/401 |
| 5,448,226 | 9/1995 | Failing, Jr. et al. | 340/825.35 |
| 5,794,211 | 8/1998 | Goodwin, III et al. | 705/23 |
| 6,021,345 | * 2/2000 | Goodwin, III | 705/20 |
| 6,047,263 | * 4/2000 | Goodwin, III | 705/20 |
| 6,173,268 | * 1/2001 | Goodwin, III | 705/20 |

FOREIGN PATENT DOCUMENTS

56019413-A * 2/1981 (JP).

OTHER PUBLICATIONS

Automatic I.D. News. v. 13. n 8, p. 54., Jul. 1997, "Consumers to check out technology to save time at check-out".*
PR Newswire, Jan. 9, 1997, "Pricer AB and Telxon Coporation to Cooperate in Technology Development and Marketing".*

* cited by examiner

Primary Examiner—Richard Chilcot
(74) Attorney, Agent, or Firm—Paul W. Martin; Priest & Goldstein, PLLC

(57) ABSTRACT

A temporary display sequence change method which keeps track of replaced data. A first sequence for displaying first pieces of information by an EPL is determined. A second sequence by which the EPL currently displays second pieces of information is determined. If at least one of the pieces of first information is different from the pieces of second information, whether the one piece replaces another piece of second information is determined. If the one piece does not replace the other piece, the one piece of information is obtained. If the one piece does replace the other piece, the one piece of information is obtained and the other piece and its memory location are stored. A first change sequence message including the one piece of information is sent. The first pieces of information are displayed in accordance with the first sequence for a predetermined time period. A second change sequence message addressed to the EPL containing a command to execute the second sequence is created and includes the other piece of second information and its corresponding memory location if it was replaced by the one piece of first information. Finally, the second change sequence message is sent to the EPL.

22 Claims, 3 Drawing Sheets

METHOD OF TEMPORARILY CHANGING AN ELECTRONIC PRICE LABEL DISPLAY SEQUENCE

BACKGROUND OF THE INVENTION

The present invention relates to electronic price label (EPL) systems, and more specifically to a method of temporarily changing an EPL display sequence.

EPL systems typically include a plurality of EPLs for merchandise items in a transaction establishment. EPLs typically display the price of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file and stored within an EPL price change record.

EPLs are also being used to display more than just price information. Retailers are using EPLs to display promotional information in order to more effectively market associated merchandise items. During off-peak hours, retailers display inventory and status information for the benefit of employees. EPLs may be programmed to display more than one type of information in sequences using flashing and scheduling techniques.

However, EPLs have limited memory capacity for storing the many types of information which must be displayed. For example, a typical EPL has four data registers which can simultaneously store, at most, two types of information. Therefore, it would be desirable for providing a method of temporarily changing display sequences and returning to previously display sequences despite the memory capacity limitation of an EPL.

SUMMARY OF THE INVENTION

In accordance with the teachings of the present invention, a method of temporarily changing an EPL display sequence is provided.

The method includes the steps of (a) determining a first sequence for displaying first pieces of information by an EPL;

(b) determining a second sequence by which the EPL currently displays second pieces of information;

(c) if at least one of the pieces of first information is different from the pieces of second information, determining whether the one piece replaces another piece of second information;
   if the one piece does not replace the other piece, obtaining the one piece of information;
   if the one piece does replace the other piece, obtaining the one piece of information and storing the other piece and its memory location;

(d) sending a first change sequence message including the one piece of information;

(e) displaying the first pieces of information in accordance with the first sequence for a predetermined time period;

(f) creating a second change sequence message addressed to the EPL containing a command to execute the second sequence, including the other piece of second information and its corresponding memory location if it was replaced by the one piece of first information; and (g) sending the second change sequence message to the EPL.

It is accordingly an object of the present invention to provide a method of temporarily changing an EPL display sequence.

It is another object of the present invention to replace a display sequence and display data, if necessary, in memory.

It is another object of the present invention to provide a method of displaying a different type of information under a different display sequence and returning to the previous display sequence and its previously displayed information.

It is another object of the present invention to provide a method of displaying a different type of information under a different display sequence and returning to the previous display sequence and its previously displayed information in order to compensate for insufficient memory capacity in EPLs.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
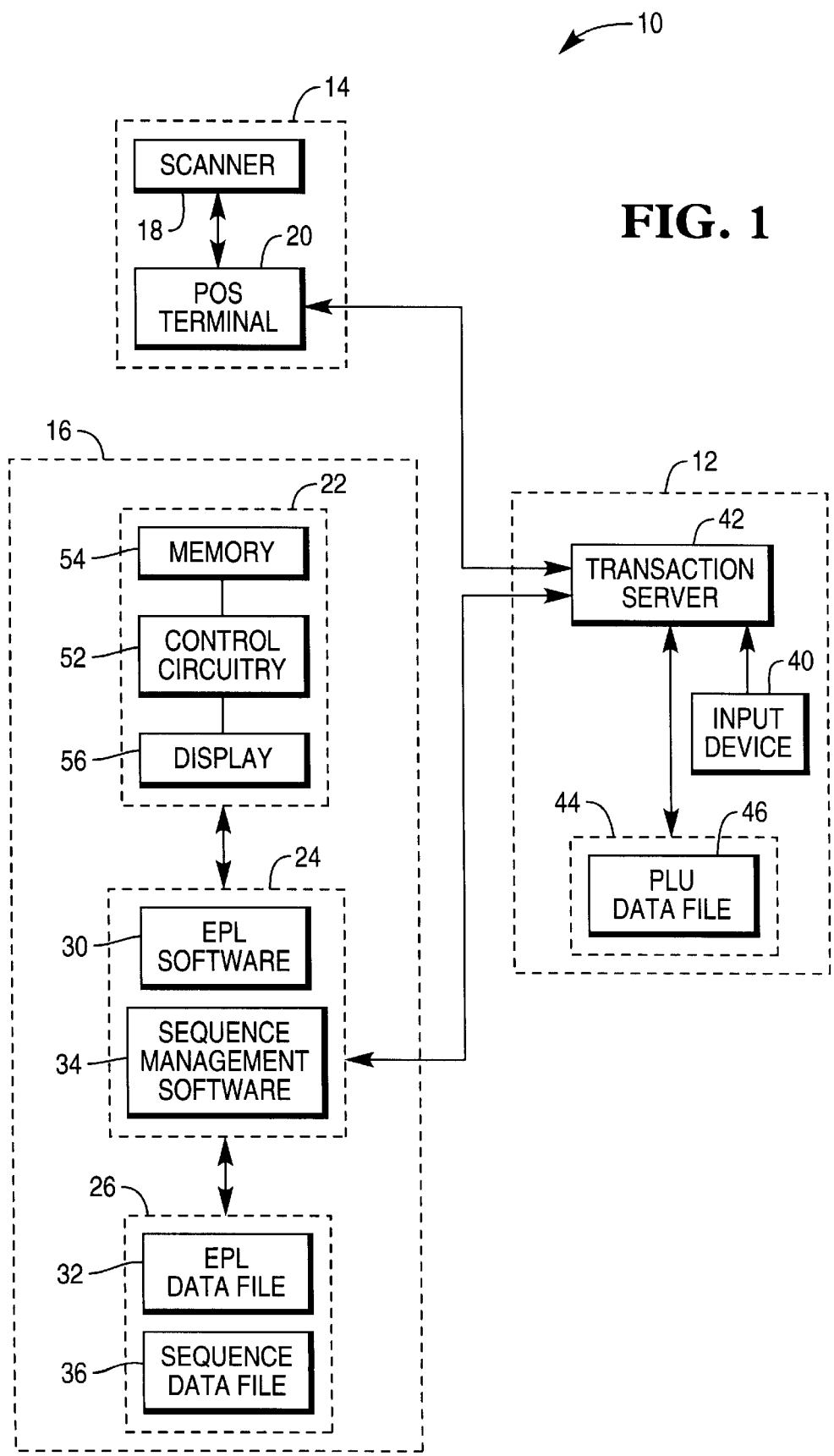
FIG. 1 is a block diagram of a transaction processing system.

Referring now to FIG. 1, a first embodiment of transaction system 10 primarily includes host computer system 12, point-of-sale (POS) system 14, and EPL system 16. Here, components 12, 14, and 16 are shown as separate components that are networked together, but they may also be combined in different ways to form less components. Thus, host computer system 12 may be a POS terminal which doubles as a host computer for network of other POS terminals. Also, host computer system 12 and EPL system 16 may be combined into a single system.

POS system 14 includes bar code reader 18 and terminal 20.

EPL system 16 primarily includes EPLs 22, host EPL terminal 24, and EPL storage medium 26.

EPLs 22 include control circuitry 52, data memory 54 and displays 56.

Control circuitry 52 receives and transmits messages from EPL terminal 24 and controls display of information by display 56. Control circuitry 52 stores data and instructions within the messages. For example, control circuitry 52 stores price and promotional information in data memory 54. Control circuitry also stores display sequence information in memory 54 and responds to basic control instructions, including an instruction to replace and remember a display sequence, and an instruction to restore a previous display sequence.

Host EPL terminal 24 executes EPL software 30. To assist with execution of certain tasks performed by EPL software 30, EPL terminal 24 includes a built-in time keeping device, commonly referred to as a system clock, which is synchronized with current time, in order to automatically execute the tasks at their scheduled times.

EPL software 30 is responsible for scheduling and transmitting data to EPLs 22. EPL software 30 obtains prices in price look-up (PLU) data file.

Host EPL terminal 24 also executes sequence management software 34 which manages display sequence changes. Under the present invention, sequence management software 34 automatically or in response to operator-initiated commands changes and restores display sequences. Sequence management software 34 may additionally send temporary display data to the extent that a temporary display sequence calls for display data which is not already in memory 54. Following the temporary display period, sequence management software 34 sends a message containing an instruction to restore the previous display sequence may additionally send previously displayed data to the extent it was replaced by temporary display data.

Sequence management software 34 tracks display sequence changes and whether data has been removed from the memories of EPLs 22 in sequence data file 36.

EPL storage medium 26 stores EPL data file 32 sequence data file 36. EPL storage medium 26 and is preferably a fixed disk drive.

EPL data file 32 contains EPL identification and checksum information. Checksum information is calculated from price information in PLU data file 46 and business information in business information data file 66. EPL data file 32 identifies information that is currently stored and displayed by EPLs 22.

Host computer system 12 includes PLU storage medium 44, transaction server 42, and input device 40.

Transaction server 42 handles price requests from POS terminal 20. POS terminal 20 sends item identification information to transaction server 42 and transaction server 42 returns the corresponding price from PLU data file 46.

PLU storage medium 44 stores PLU data file 46. PLU data file 46 is available for distribution to POS terminal 20. Provision may be made for direct access to PLU data file 46 by bar code reader 18.

Figure 2A:
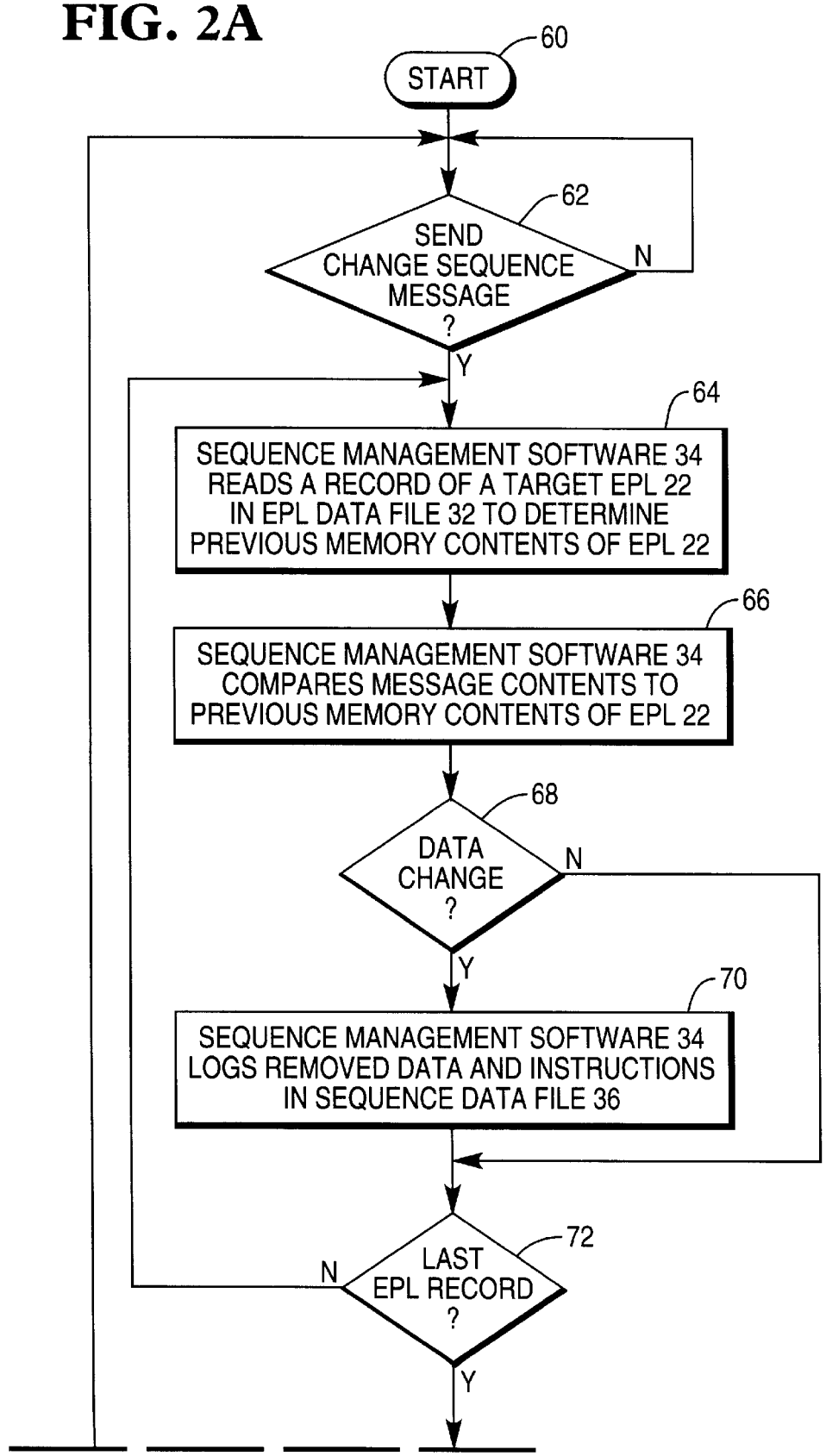
FIGS. 2A and 2B form a flow diagram illustrating the method of the present invention.
Figure 2B:
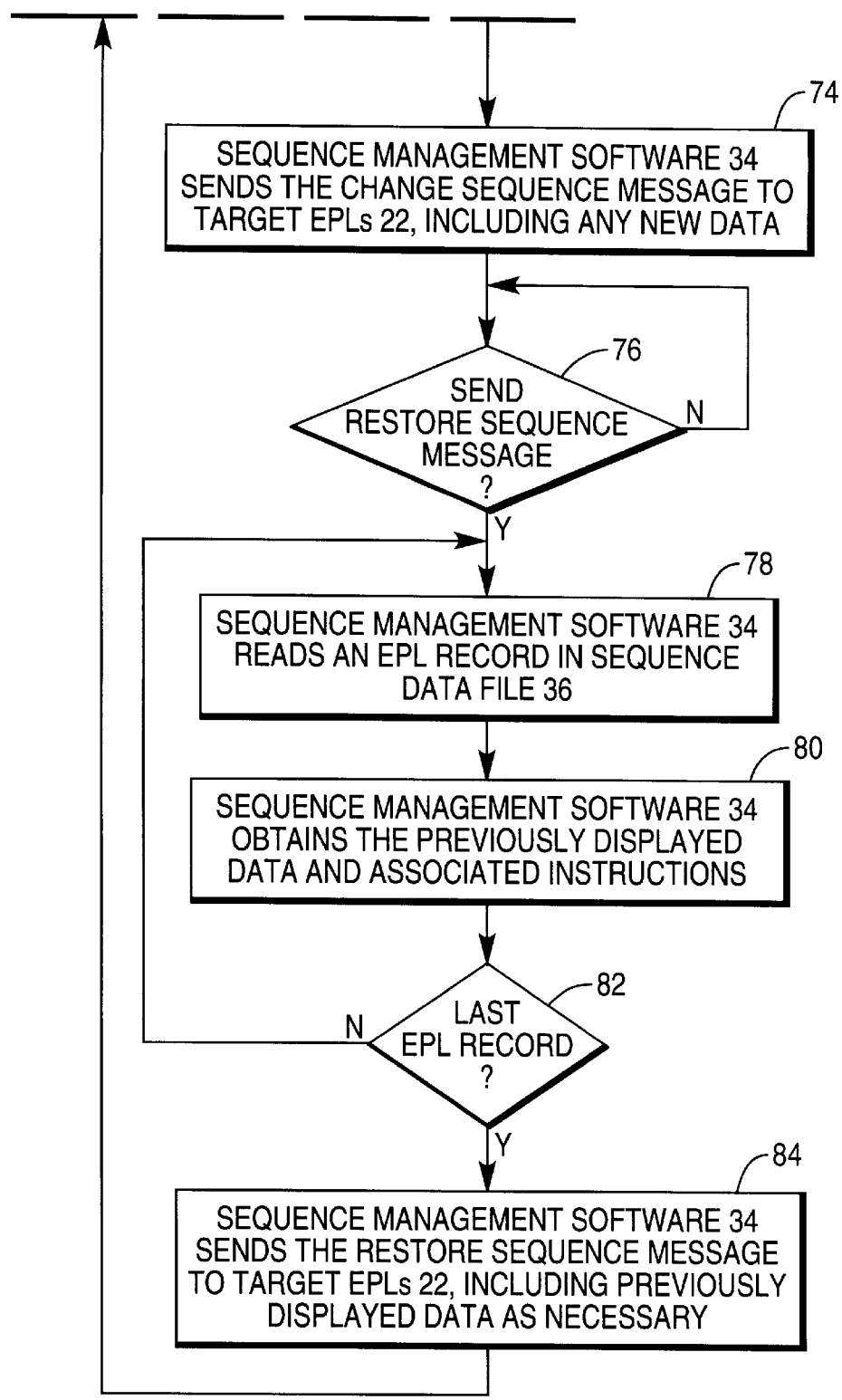

Turning now to FIG. 2, the sequence management method of the present invention is illustrated in detail beginning with START 60.

In step 62, sequence management software 34 waits for an indication to send a change sequence message to one or more EPLs 22. The indication may come from its own internal scheduler (automatic operation) or from operator action (manual operation).

In step 64, after receiving the indication, sequence management software 34 reads a record of a target EPL 22 in EPL data file 32 to determine previous memory contents of EPL 22.

In step 66, sequence management software 34 compares message contents to previous memory contents of EPL 22.

In step 68, sequence management software 34 determines whether the contents are different. If so, operation proceeds to step 70. If not, operation proceeds to step 72.

In step 70, sequence management software 34 logs removed data, memory location, and instructions in sequence data file 36. Sequence management software 34 obtains replacement or new data from its source.

In step 72, sequence management software 34 determines whether the EPL record is the last EPL record. If not, operation returns to step 64. If so, operation proceeds to step 74.

In step 74, sequence management software 34 sends a change sequence message. The message may be a broadcast message or an individually-addressed message.

For example, in order to display information for employee operations, the change sequence message would typically be sent via broadcast message addressed to all EPLs 22. Using this example, the message would also include an instruction containing a temporary display sequence, such as a sequence which alternatingly flashes price information and employee-directed information.

The target EPLs 22 receive the change sequence messages and any associated display data. The target EPLs store the previous display sequence in memory and execute the temporary display sequence in the change sequence message.

In step 76, sequence management software 34 waits for the end of the temporary period. During the temporary period, employees may be restocking shelves, taking inventory, and performing other store-related tasks using the information displayed by EPLs 22. Operation proceeds until sequence management software 34 determines that the temporary display period has ended, manually or through automatic scheduling.

In steps 78–82, following the temporary period, sequence management software 34 determines whether previously stored data must be sent to EPLs 22.

In step 78, sequence management software 34 reads an EPL record in sequence data file 36.

In step 80, sequence management software 34 retrieves data and instructions identified in sequence data file 36. Sequence management software 34 reads the data from other data files as necessary.

In step 82, sequence management software 34 determines whether the record is the last EPL record. If not, operation returns to step 78. If so, operation proceeds to step 84.

In step 84, sequence management software 34 sends the restore sequence message to target EPLs 22, including any data and instructions to be restored, the memory location for storing the data, and an instruction to store the data in the memory location.

For example, if an EPL 22 was displaying promotional information (e.g., "On Sale") and price information and the promotional information was removed, the sequence management software 34 would send a message containing the promotional information along with the instruction to restore the previous display sequence. EPL 22 would receive the message, store the data, and retrieve and execute the previous display sequence.

Advantageously, the method of the present minimizes temporary storage problems in EPLs 22 having limited memory capacity. Specifically, the present invention automatically tracks and restores data and/or instructions which are removed from some EPLs 22 to make room for new data and/or instructions to be displayed by the EPLs 22 during a temporary period.

Although the present invention has been described with particular reference to certain preferred embodiments thereof, variations and modifications of the present invention can be effected within the spirit and scope of the following claims.

What is claimed is:

1. An electronic price label (EPL) display sequence change method comprising the steps of:
    (a) determining a first sequence for displaying first pieces of information by an EPL;
    (b) determining a second sequence by which the EPL currently displays second pieces of information in a plurality of different locations in a memory within an EPL;
    (c) if the first sequence replaces at least one of the pieces of second information in a predetermined memory location with a piece of the first information, storing the one piece of second information to be replaced and its corresponding memory location;

(d) sending a first change sequence message containing the piece of the first information;

(e) displaying the first pieces of information in accordance with the first sequence for a predetermined time period;

(f) creating a second change sequence message addressed to the EPL containing a command to execute the second sequence, including the one piece of second information and its corresponding memory location; and (g) sending the second change sequence message to the EPL.

2. The method as recited in claim 1, wherein step (d) comprises the step of:

(d-1) sending the change sequence message as a broadcast message to the EPL and to other EPLs.

3. The method as recited in claim 1, wherein step (d) comprises the step of:

(d-1) sending the change sequence message only to the EPL.

4. An electronic price label (EPL) display sequence change method comprising the steps of:

(a) determining a first sequence for displaying first pieces of information by an EPL;

(b) determining a second sequence by which the EPL currently displays second pieces of information;

(c) if at least one of the pieces of second information is different from the pieces of first information, storing the one piece of second information; and (d) sending the change sequence message.

5. The method as recited in claim 4, wherein step (a) comprises the step of:

(a-1) determining a first sequence which alternatingly flashes price information and employee directed information.

6. An electronic price label (EPL) display sequence change method comprising the steps of:

(a) determining a first sequence for displaying first pieces of information by an EPL;

(b) determining a second sequence by which the EPL currently displays second pieces of information;

(c) if at least one of the pieces of first information is different from the pieces of second information, determining whether the one piece replaces another piece of second information;

if the one piece does not replace the other piece, obtaining the one piece of information;

if the one piece does replace the other piece, obtaining the one piece of information and storing the other piece and its memory location;

(d) sending a first change sequence message including the one piece of information;

(e) displaying the first pieces of information in accordance with the first sequence for a predetermined time period;

(f) creating a second change sequence message addressed to the EPL containing a command to execute the second sequence, including the other piece of second information and its corresponding memory location if it was replaced by the one piece of first information; and (g) sending the second change sequence message to the EPL.

7. An electronic price label (EPL) system comprising:

an EPL including a memory containing a plurality of different locations for storing pieces of information; and a computer which determines a first sequence for displaying first pieces of information, determines a second sequence by which the EPL currently displays second pieces of information, stores at least one piece of second information if at least the one piece of second information is different from the pieces of first information, sends a first change sequence message to the EPL to cause the EPL to display the first pieces of information in accordance with the first sequence for a predetermined time period, creates a second change sequence message addressed to the EPL containing a command to execute the second sequence including the one piece of second information and its corresponding memory location, and sends the second change sequence message following the predetermined time period.

8. An electronic price label (EPL) display sequence change method comprising the steps of:

receiving an indication to send a change sequence message to an EPL, the indication including new display data to be displayed by the EPL and new sequence data to control the display of the new display data;

reading a computer record to determine current memory contents of the EPL;

updating the computer record to include the new display data and the new sequence data, if the record does not include the new display data and the new sequence data;

sending the change sequence message to the EPL, the change sequence message including any portion of the new display data and the new sequence data which was updated in the computer record;

receiving the change sequence message by the EPL;

updating the memory contents of the EPL to include any new data included in the change sequence message; and displaying the new display data in the new sequence by the EPL as determined by the updated memory contents.

9. The method of claim 8 wherein the step of updating includes the sub-step of deleting at least a portion of the current data of the record.

10. The method of claim 9 further comprising the step of:

storing the deleted data in a second computer record, the deleted data representing data deleted from the memory of the EPL when the memory contents of the EPL was updated.

11. The method of claim 10 further comprising the step of:

waiting a period of time;

preparing a second change sequence message; and sending a second change sequence message to the EPL.

12. The method of claim 11 wherein the step of preparing comprises the sub-step of:

reading the second computer record to determine the deleted data.

13. The method of claim 12 wherein the second change sequence message includes a command to restore the deleted data to the EPL's memory.

14. The method of claim 13 further comprising the step of:

updating the record to include the previously deleted data.

15. The method of claim 8 wherein the step of displaying further comprises the sub-step of:

alternatingly displaying price information and employee directed information.

16. An electronic price label (EPL) system comprising:

an EPL displaying first information in a first display sequence, the EPL including control circuitry, a display and memory circuitry, the control circuitry operating to read the memory circuitry and to enable the EPL to display information in a display sequence as determined by the contents of the memory circuitry; and a computer which determines a second change sequence for displaying second information, reads a computer record to determine the EPL's memory contents, updates the computer record to include the second change sequence and the second information, and transmits a change sequence message instructing the EPL to display the second information in the second change sequence.

17. The EPL system of claim 16 wherein the computer updates a second computer record to include any data removed from the computer record during the update of the computer record.

18. The EPL system of claim 17 wherein the computer transmits a second change sequence message to the EPL instructing the EPL to display the first information in the first change sequence.

19. The EPL system of claim 18 wherein the second change message includes the data removed from the computer record.

20. The EPL system of claim 19 wherein the computer updates the computer record to include the first change sequence and the first information.

21. An electronic price label system comprising of:

an EPL operable to display data in a display sequence, the EPL including control circuitry, a display and memory circuitry, the control circuitry operable to read the memory circuitry and to enable the EPL to display data in the display sequence as determined by the contents of the memory circuitry; and a computer for reading a record to determine the current memory contents of the EPL memory circuitry, updating the record to include the new display data and the new sequence data if the record does not include the new display data and the new sequence data, and sending the change sequence message to the EPL, the change sequence message including any portion of the new display data and the new sequence data which was updated in the record;

the EPL further operable to receive the change sequence message by the EPL, to update the memory contents of the EPL to include any new data included in the change sequence message, and to display the new data in the new sequence by the EPL as determined by the updated memory circuitry contents.

22. The electronic price label system of claim 21 wherein the computer is further operable to wait a period of time and to send a second change sequence message to the EPL which instructs the EPL to display the data in the display sequence.

* * * * *